Patented Nov. 22, 1949

2,488,737

UNITED STATES PATENT OFFICE 2,488,737

PENILLAMINE G HYDROHALIDES AND PROCESS FOR PRODUCING THE SAME

Robert L. Peck, Plainfield, N. J., assignor to Merck & Co., Inc., Rahway, N. J., a corporation of New Jersey No Drawing. Application December 21, 1945, Serial No. 636,521

6 Claims. (Cl. 260—309)

This invention relates to certain new chemical compounds; more particularly to hydrohalides of penillamine G, which are useful in the synthesis of penicillin and chemically related compounds having antibiotic activity, and to the process for preparing such compounds.

In preparing hydrohalides of penillamine G, I preferably use as a starting material penillic acid G, an optically active compound having the empiric formula $C_{16}H_{18}N_2O_4S$ and melting at about 191–192° C., which can be prepared by reacting sodium penicillin G with a mineral acid such as about 2.5 N sulfuric acid, extracting the reaction mixture with butanol, concentrating the extract to small volume, and purifying the crystalline penillic acid G thus formed by recrystallization from water, methanol, or the like.

Sodium penicillin G is in turn prepared by propagating the organism *Penicillium notatum* #832 NRRL in a nutrient medium, extracting the acidified medium with a suitable solvent such as amyl acetate, and converting the penicillin G thus obtained to sodium penicillin G by treating with a suitable base such as sodium bicarbonate.

In carrying out the process of the present invention penillic acid G is reacted with a mercuric halide such as mercuric chloride in a suitable medium such as absolute methanol, aqueous solution neutralized with barium hydroxide, and the like. The reaction is conducted at about room temperature and is accompanied by evolution of carbon dioxide and a lowering of the specific rotation of the solution.

Mercury is then removed by passing hydrogen sulfide gas through the reaction mixture and filtering off the mercuric sulfide thus formed. Barium, if present, is removed by precipitation with sulfuric acid.

The resulting filtrates contain penillamine G hydrochloride which is recovered from alcoholic solution merely by evaporation of the solvent, and from aqueous solution preferably by freezing the solution and drying from the frozen state under reduced pressure. Upon recrystallization from acetone by addition of benzene and ether, the product penillamine G hydrochloride of empirical formula $C_{15}H_{19}N_2O_2SCl$ melts at about 169–170° C. and shows an optical rotation $(\alpha)_D^{25}$ —65° (c, 0.35% in water).

The following examples illustrate methods of carrying out the process of the present invention but it will be understood that these examples are given by way of illustration and not of limitation.

Example I

To 26.7 mg. of penillic acid G in 10 cc. of methanol (absolute) was added 0.7 cc. of 10% mercuric chloride. The initial rotation of the solution fell to $(\alpha)_D^{25}$ —56° after about 23 hours at room temperature. The product obtained after removing mercury with hydrogen sulfide, and evaporating the filtrate to dryness was a hydrochloride which gave a blue color with ferric chloride.

*Anal.*—Calcd. for $C_{15}H_{19}N_2O_2SCl$: C, 55.12; H, 5.55; N, 8.57; Cl, 10.85. Found: C, 54.98; H, 5.84; N, 8.59; Cl, 10.62.

Example II

To 131 mg. of penillic acid G in 50 cc. of water neutralized with 1.45 cc. of 0.5426 N barium hydroxide was added 10.65 cc. of 5.0% aqueous mercuric chloride. There was liberated 17.2 mg. of carbon dioxide calcd. 17.25 mg.) after 2½ hours at room temperature. Mercury was removed with hydrogen sulfide, barium by the addition of 4.3 cc. of 0.183 N sulfuric acid, and the final filtrate was frozen and dried from the frozen state under reduced pressure giving a crystalline residue of penillamine G hydrochloride. After recrystallization from acetone by addition of benzene and ether, the crystals melted at 169–170° C. and showed $(\alpha)_D^{25}$ —65° (c, 0.35% in water).

*Anal.*—Calcd. for $C_{15}H_{19}N_2O_2SCl$: C, 55.12; H, 5.55; N, 8.57. Found: C, 55.24; H, 5.83; N, 8.49.

Modifications can be made in the procedures herein described without departing from the spirit and scope of the present invention, and I am to be limited only by the appended claims.

What is claimed is:

1. Hydrohalides of penillamine G.
2. Penillamine G hydrochloride.
3. The process that comprises reacting penillic acid G with a mercuric halide in solvent medium for about two and one-half to twenty-four hours, removing mercury from the reaction mixture by precipitating with hydrogen sulfide, and recovering from the solution thus obtained the corresponding hydrohalide of penillamine G.
4. The process that comprises reacting penillic acid G with mercuric chloride in a solvent medium for about two and one-half to twenty-four hours, removing mercury from the reaction mixture by precipitating with hydrogen sulfide, and recovering penillamine G hydrochloride from the solution thus obtained.

5. The process that comprises reacting penillic acid G with mercuric chloride in absolute methanol for about twenty-three hours, removing mercury from the reaction mixture by precipitating with hydrogen sulfide, and recovering penillamine G hydrochloride by evaporating the methanolic solution thus obtained.

6. The process that comprises reacting an aqueous solution of penillic acid G containing barium hydroxide sufficient to neutralize the acid, with mercuric chloride for about two and one-half hours, removing mercury from the reaction mixture by precipitating with hydrogen sulfide and barium by precipitating with sulfuric acid, and recovering penillamine G hydrochloride from the aqueous solution thus obtained.

ROBERT L. PECK.

REFERENCES CITED

The following references are of record in the file of this patent:

"Nature," vol. 151, Feb. 27, 1943, page 251, Pen. Dig.

O. S. R. D. Report—Merck & Co. (M-1 at page 13), Nov. 1943.

O. S. R. D. Report—Squibb Institute for Medical Research (S-1 at page 6), Dec. 20, 1943.

O. S. R. D. Report—Pfizer and Co. (P-4 at page 21), Jan. 2, 1944.